(12) United States Patent
Grant et al.

(10) Patent No.: US 11,906,971 B2
(45) Date of Patent: Feb. 20, 2024

(54) SPATIOTEMPORAL ROBOTIC NAVIGATION

(71) Applicant: inVia Robotics, Inc., Westlake Village, CA (US)

(72) Inventors: William Shane Simpson Grant, Van Nuys, CA (US); Randolph Charles Voorhies, Culver City, CA (US); Lior Elazary, Agoura Hills, CA (US); Daniel Frank Parks, II, Los Angeles, CA (US)

(73) Assignee: inVia Robotics, Inc., Westlake Village, CA (US)

( * ) Notice: Subject to any disclaimer, the term of this patent is extended or adjusted under 35 U.S.C. 154(b) by 438 days.

(21) Appl. No.: 17/409,480

(22) Filed: Aug. 23, 2021

(65) Prior Publication Data

US 2021/0382493 A1    Dec. 9, 2021

Related U.S. Application Data

(63) Continuation of application No. 16/044,264, filed on Jul. 24, 2018, now Pat. No. 11,099,576.

(51) Int. Cl.
*G05D 1/02* (2020.01)
*G05D 1/00* (2006.01)

(52) U.S. Cl.
CPC ......... *G05D 1/0221* (2013.01); *G05D 1/0217* (2013.01); *G05D 1/0219* (2013.01); *G05D 1/0291* (2013.01)

(58) Field of Classification Search
CPC .. G05D 1/0221; G05D 1/0217; G05D 1/0219; G05D 1/0291; G05D 2201/0216
See application file for complete search history.

(56) References Cited

U.S. PATENT DOCUMENTS

2019/0286145 A1\* 9/2019 LaFary ................ G05D 1/0255

\* cited by examiner

*Primary Examiner* — Basil T. Jos
(74) *Attorney, Agent, or Firm* — Ansari Katiraei LLP; Arman Katiraei; Sadiq Ansari

(57) ABSTRACT

Spatiotemporal robotic navigation may include providing a set of robots non-conflicting access to the same shared resources at different times so that the robots may operate without continually accounting for the locations of the other robots and workers operating in the particular site, without continually planning or updating paths after determining an initial path, and without continuously adjusting movements as the robots near one another. The spatiotemporal robotic navigation involves generating spatiotemporal plans. Each plan has a set of objectives that a robot is to execute by different time intervals. Each plan is generated so as to not conflict with the resources being accessed by other robots at time intervals set in the plans of other robots.

19 Claims, 7 Drawing Sheets

SPATIOTEMPORAL ROBOTIC NAVIGATION

CLAIM OF BENEFIT TO RELATED APPLICATIONS

This application is a continuation of U.S. nonprovisional application Ser. No. 16/044,264 entitled "Spatiotemporal Robotic Navigation", filed Jul. 24, 2018. The contents of application Ser. No. 16/044,264 are hereby incorporated by reference.

BACKGROUND INFORMATION

Robots have been and continue to be introduced into the workplace to automate various tasks therein. Robots are autonomous machines that may work in tandem with humans or with other robots.

A robot may move, via some form of locomotion (e.g., wheels, tracks, legs, propellers, etc.), to deliver goods or perform other tasks in a warehouse or other site. Simultaneously, humans, other robots, and/or other objects may move in the same site. As congestion increases, so too do the navigational and operational challenges. For instance, increased congestion may lead to an increase in the number of potential collisions, deadlocks, and other conflicts.

Robots have sensors with which they can detect potential access conflicts and obstacles. In response to detecting a conflict, a robot may adjust its operation to work around the conflict. Each such adjustment may cause the robot to slow down, stop, change course, or perform other maneuvers that lengthen the amount of time it takes for the robot to complete its task. Moreover, each adjustment may create a cascading effect in which an adjustment by a first robot creates a new conflict or obstacle for a second robot, thereby forcing the second robot to adjust its path. Each additional conflict and adjustment resulting from increased congestion may decrease overall robot efficiency and the number of tasks each robot can complete in a given amount of time. Collisions, deadlocks, and other conflicts may extend to any shared resource, besides physical space, that two or more robots may access.

DETAILED DESCRIPTION OF PREFERRED EMBODIMENTS

Figure 1:
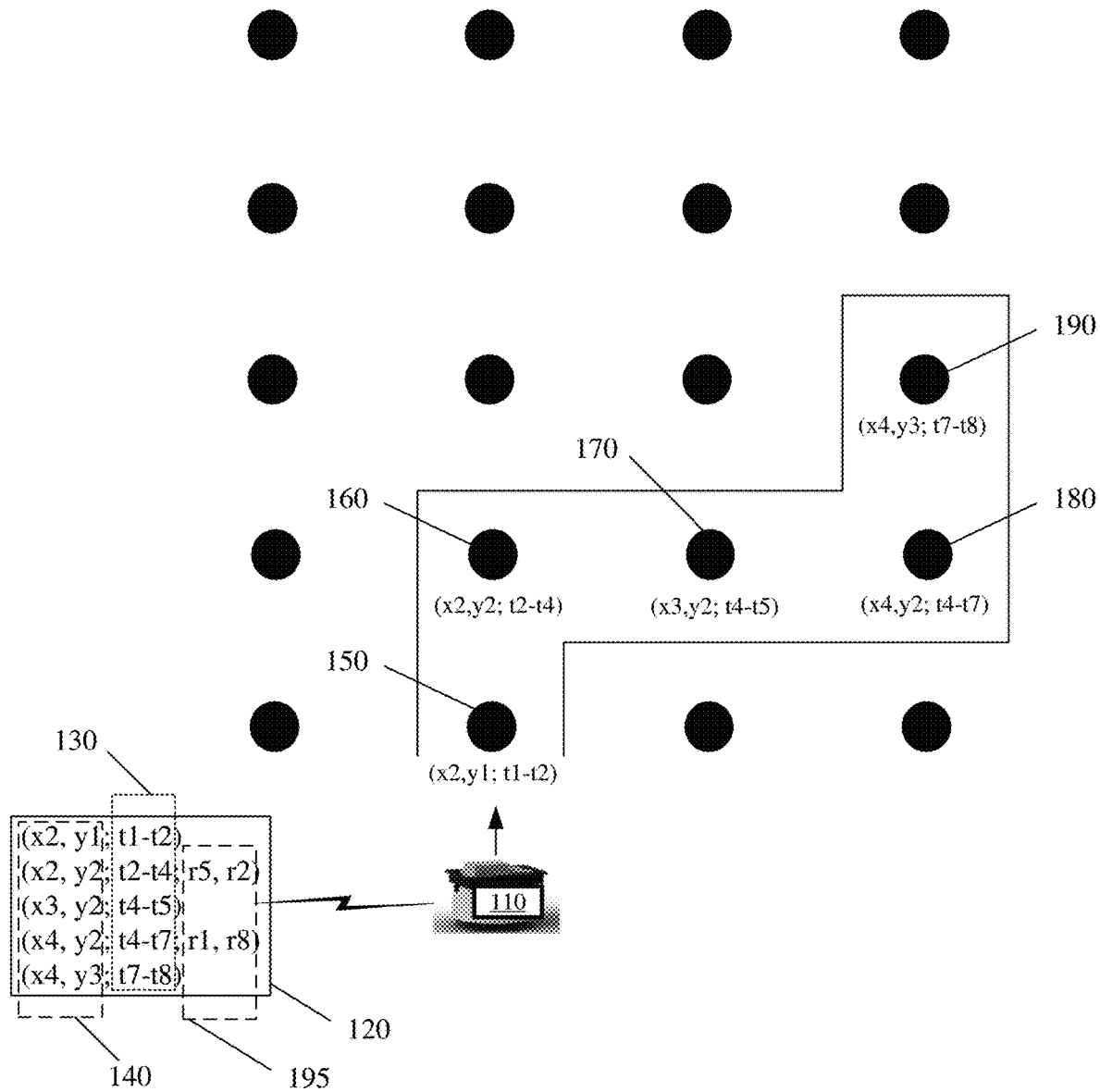
FIG. 1 illustrates an example of a robot navigating according to a spatiotemporal plan in accordance with some embodiments.

Systems and methods, as presented herein, provide spatiotemporal robotic navigation. The spatiotemporal robotic navigation may include controlling access by a plurality of robots to the same shared resources of a particular site at different times based on non-conflicting spatiotemporal plans. The spatiotemporal plans allow each robot to access the shared resources without continuously performing conflict avoidance and without blocking or otherwise impacting movements of other robots accessing the same resources at different times. Specifically, the robots can access the shared resources without continually accounting for the locations of the other robots and workers operating in the particular site, without continually planning or updating paths after determining an initial path, and without continuously adjusting movements as the robots near one another.

In some embodiments, the spatiotemporal robotic navigation may include controlling movements of different robots based on the spatiotemporal plans. Each spatiotemporal plan may provide a robot non-conflicting access to different resources (e.g., points in space) and different time intervals with which to access the different resources. A time interval associated with a given resource may specify a first time after which the robot may access the resource, and/or a second time after which the robot is to complete its access of the resource. The second time may be one or more seconds after the first time, or may be an unconstrained amount of time. Each spatiotemporal plan may also provide a precedence ordering by which different robots may access the same shared resource. The precedence ordering may be based on the time intervals, and may be used in conjunction with the time intervals to further eliminate conflict (e.g., collision, delay, becoming deadlocked, etc.). For instance, when actual resource access by the robots deviates from the time intervals or expected resource access set forth within the spatiotemporal plans, the precedence ordering may ensure that the robots do not deviate from the coordinated operation set forth in the spatiotemporal plans. Similarly, when actual resource access by the robots deviates from the time intervals or expected resource access set forth within the spatiotemporal plans, and causes two or more robots attempt to access a shared resource at or near the same time, the precedence ordering may ensure non-conflicting access to that shared resource by determining which robot has first access to the shared resource.

The spatiotemporal plan resources may correspond to different points in space and/or time. The points in space and time associated with a spatiotemporal plan resource can be defined with any desired granularity. As one example, a point in space may be 2 feet in length and 2 feet in width, and a 2 second time interval may be provided for a robot to access that point in space. As another example, a point in space may be 6 feet in length and 3 feet in width, and a 10 second interval may be provided for a robot to access that point in space. The more granular planning provides tighter control over the movements and operations of the robots, whereas a less granular planning provides the robots with more autonomy in executing the plan.

In addition to or instead of different points of physical space, each spatiotemporal plan may also provide a robot access to other shared resources at different time intervals. The shared resources may include shared compute resources, shared sensors, another robot (e.g., a retrieval robot accessing a picking robot), human workers, etc.

FIG. 1 illustrates an example of robot 110 navigating according to spatiotemporal plan 120. Spatiotemporal plan 120 identifies different time intervals 130 by which robot 110 may access different points in space 140. Each time interval 130 may specify an earliest access time by which robot 110 may access a corresponding point in space 140, and/or a last access time by which robot 110 is to complete accessing the corresponding point in space 140.

Each point in space 140 that is associated with a point in time 130 may represent a different waypoint 150, 160, 170, 180, and 190. Each waypoint 150-190 may therefore be a different objective for robot 110 to complete by a specific amount of time or within a time interval via physical robotic movements.

One or more of waypoints 150-190 may also be associated with a precedence order 195. The precedence order 195 identifies a shared resource that robot 110 and other robots are expected to access, and provides an order by which each robot is permitted to access the shared resource. For instance, precedence order 195 allows robot 110 to access waypoint 160, corresponding to a point in space (e.g., x2 and y2) within a specified time interval (e.g., t2-t4), after a first robot (e.g., robot r5) and a second robot (e.g., robot r2) have finished accessing that same point in space.

Precedence order 195 may be added to spatiotemporal plan 120 to ensure the coordinated operation of the robots, via adherence to their spatiotemporal plans, even when actual operation of robot 110 or the other robots deviates from the spatiotemporal plan being executed by the robot. For instance, the spatiotemporal plans executed by the robots (e.g., robot 110, robot "r5", and robot "r2" ion FIG. 1) are defined so that each robot may access a waypoint or resource without conflict. However, failures, outages, unexpected events, or actual movements or operation of a robot may cause the robot to arrive earlier or later than expected. Precedence order 195 may ensure that the robots adhere to their spatiotemporal plans and do not move out of order despite one or more robots deviating from their spatiotemporal plans.

Robot 110 may have a kinematics controller that controls the actuators of the robot to autonomously perform or complete the objective associated with each waypoint 150-190 within the time interval specified in spatiotemporal plan 120. The actuators may include the motors, engines, pistons, lifts, mechanical arms, vacuums, and other mechanical elements of the robot that produce physical movements under control of the kinematics controller. For instance, the kinematics controller turns on and off different actuators, issues commands to the activated actuators, and/or adjusts power that is supplied to the activated actuators to produce the physical robotic movements that execute the different waypoint objectives.

In FIG. 1, waypoints 150-190 are closely defined, leaving robot 110 with less autonomy on how to complete each waypoint objective. In some embodiments, the waypoint objectives can be more loosely defined. For instance, the spatiotemporal plan may include individual waypoints that span one or more shared resources (e.g., physical space) and wider time intervals with which to access the one or more shared resources. In such instances, the robots may have greater autonomy with respect to completing the waypoint objectives or tasks. The greater autonomy may include allowing the robot to determine which resources to access in order to complete a waypoint objective, and/or providing the robot with a greater time window and more general tasks, which in turn gives the robot more control over its actuator usage.

Figure 2:
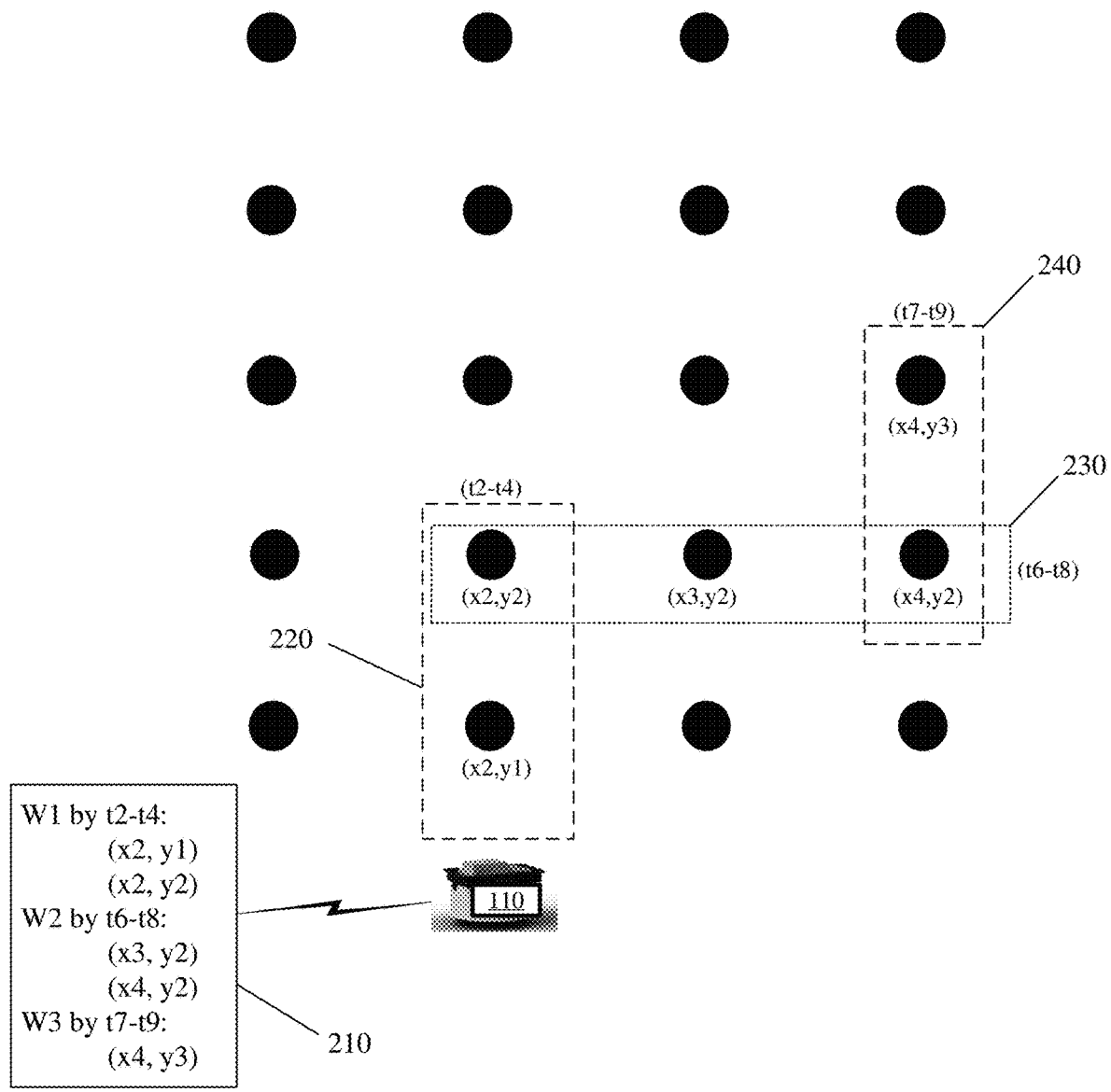
FIG. 2 illustrates an example of a robot navigating according to a spatiotemporal plan with waypoints that span one or more different points in space, and that provide different time envelopes.

FIG. 2 illustrates an example of robot 110 navigating according to spatiotemporal plan 210 with waypoints 220, 230, and 240 that span one or more different points in space, and that provide a time interval for traversing the different points in space associated with each waypoint 220, 230, or 240. Spatiotemporal plan 210 may reserve a different set of space or other shared resources for robot 110 for different time intervals. For instance, spatiotemporal plan 210 may control movements of robot 110 based on a task-to-time definition (e.g., move through (x2, y1) and (x2, y2) within time interval t2-t4, turn right and move through (x3, y2) and (x4, y2) within time interval t6-t8, and turn left, move through (x4, y3), and retrieve an item within time interval t7-t9). As noted above, the time intervals can also be unconstrained such that a different spatiotemporal plan may define movements of robot 110 based on a space-to-point in time definition (e.g., be at a first space no earlier than or by a first time, be at a second space no earlier than or by a second time, etc.).

The spatiotemporal robotic navigation presented herein supports these and other definitions for waypoints of a spatiotemporal plan. In any case, each spatiotemporal plan may reserve different shared resources within a site for a particular robot at different time intervals. It is then up to the particular robot to successfully execute each of the waypoint objectives within the allotted time interval, and thereby complete the spatiotemporal plan within the overall time allotment.

The robot may make kinematic adjustments in order to execute or complete each waypoint by a time interval specified in the spatiotemporal plan for the waypoint. The kinematic adjustments may include controlling the different actuators that produce physical movement of a robot or its various components (e.g., motors, engines, mechanical arms, lifts, vacuums, grabbers, pickers, etc.). For instance, the spatiotemporal plan may provide the robot a 6 second time interval to travel 10 feet to successfully complete the objective that is associated with a particular waypoint. The kinematic adjustments may include powering the motors that drive the robot to accelerate and travel with sufficient velocity to cover the 10 feet sometime before the 6 second time interval expires.

In some embodiments, the robot may make kinematic adjustments to complete a waypoint with some time buffer before the specified time interval for that waypoint expires. For instance, the robot may attempt to complete a waypoint with a 6 second time interval by 4 seconds in order to preserve time in the event any adjustments have to be made because of an unexpected obstacle, failure, or other conflict during execution of the waypoint, or because a precedence order providing other robots first access to one or more resources associated with the waypoint has yet to be met.

A waypoint may include other objectives, in addition to or in lieu of physical movement in space, that a robot is to complete. For instance, a waypoint may include grabbing or picking of an item or object, moving a mechanical arm some distance in three-dimensional space, raising or lowering a platform by some amount, changing direction of a camera, placement of an object, opening or closing a door, and/or other movements.

In some embodiments, a central planner offloads the computational effort for generating the spatiotemporal plans that control the movements of the robots, and may generate the plans for the robots. The central planner may be communicably coupled to the robots, and may provide the plans to the robots for execution. The central planner may be implemented as one or more machines with network access to the robots. Components of the central planner are described below with reference to FIG. 7.

In some embodiments, each robot may generate its own spatiotemporal plan using onboard processors, memory, wireless network connectivity, and other components described with reference to FIG. 7. Each robot may share its plan with other robots so that a particular robot can account for the different spaces in time that the other robots may occupy when the particular robot generates its own spatiotemporal plan.

In some embodiments, the spatiotemporal plan generation is performed by the central planner and a particular robot that is to execute the plan. The central planner may determine shared resources (e.g., points in space) that are available at different time intervals based on the spatiotemporal plans that the central planner generates for other robots. The central planner may then create a spatiotemporal plan based on the available shared resources, and may provide the plan to the particular robot. The particular robot may verify whether the provided spatiotemporal plan is kinematically feasible before accepting and executing the plan. For instance, the robot may determine whether it can successfully complete each plan objective within the time interval allotted for that objective based on performance constraints of the particular robot's actuators and other hardware. Some robots may have motors that allow them to travel faster than other robots. Some robots may have certain actuators that are required for execution of a plan, and other robots may lack those actuators. Accordingly, the particular robot may respond to the central planner by accepting a kinematically feasible plan and executing that plan, or by rejecting a plan that is not kinematically feasible based on performance constraints of the particular robot's actuators.

A prerequisite to the spatiotemporal plan generation may include mapping the shareable resources in a common site that two or more robots can access. As noted above, the resources may include physical space, physical objects (e.g., totes, bins, racks, items, etc.), compute resources, sensors, another robot (e.g., a picking robot), human workers, etc. A robot may use its sensors to map physical shareable resources. For instance, the robot may traverse each aisle in a particular site, scan fiducials or other reference markers along each aisle to map the different physical points of space to the different fiducials or other reference markers, and may report the mapping to the central planner or other robots. Alternatively, the resource mapping may be programmatically entered via the central planner.

Based on the mapping of shareable resources, the robots and/or central planner may generate different non-conflicting spatiotemporal plans for different robots to execute. Since the spatiotemporal plans are non-conflicting, and provide the robots non-conflicting access to different point in space and different points in time, the robots can efficiently execute the plans by executing each waypoint within a corresponding time interval without having to continuously perform conflict avoidance including continually accounting for the locations of the other robots and workers operating in the site, continually planning or updating paths after determining an initial path, and continuously adjusting movements as the robots near one another. The conflict avoidance is resolved during the spatiotemporal plan generation. Moreover, in the event a conflict arises as a result of a failure, outage, unexpected events, or actual movements or operation of a robot deviating from a spatiotemporal plan, the conflict can still be resolved during the spatiotemporal plan generation via the precedence ordering with which two or more robots may access the same shared resource. For instance, a first robot may determine that a potential conflict may arise at a particular point in space because a second robot is identified, based on the precedence ordering specified for an objective in the spatiotemporal plan executed by the first robot, as having priority to access the particular point in space, and the second robot has not yet signaled that it has accessed the particular point in space. The first robot may avoid the conflict by slowing down or temporarily halting operations. Alternatively, part or all of the spatiotemporal plan of the first robot may be recomputed to workaround the conflict created by the second robot failing to meet the objectives set forth in its spatiotemporal plan.

Figure 3:
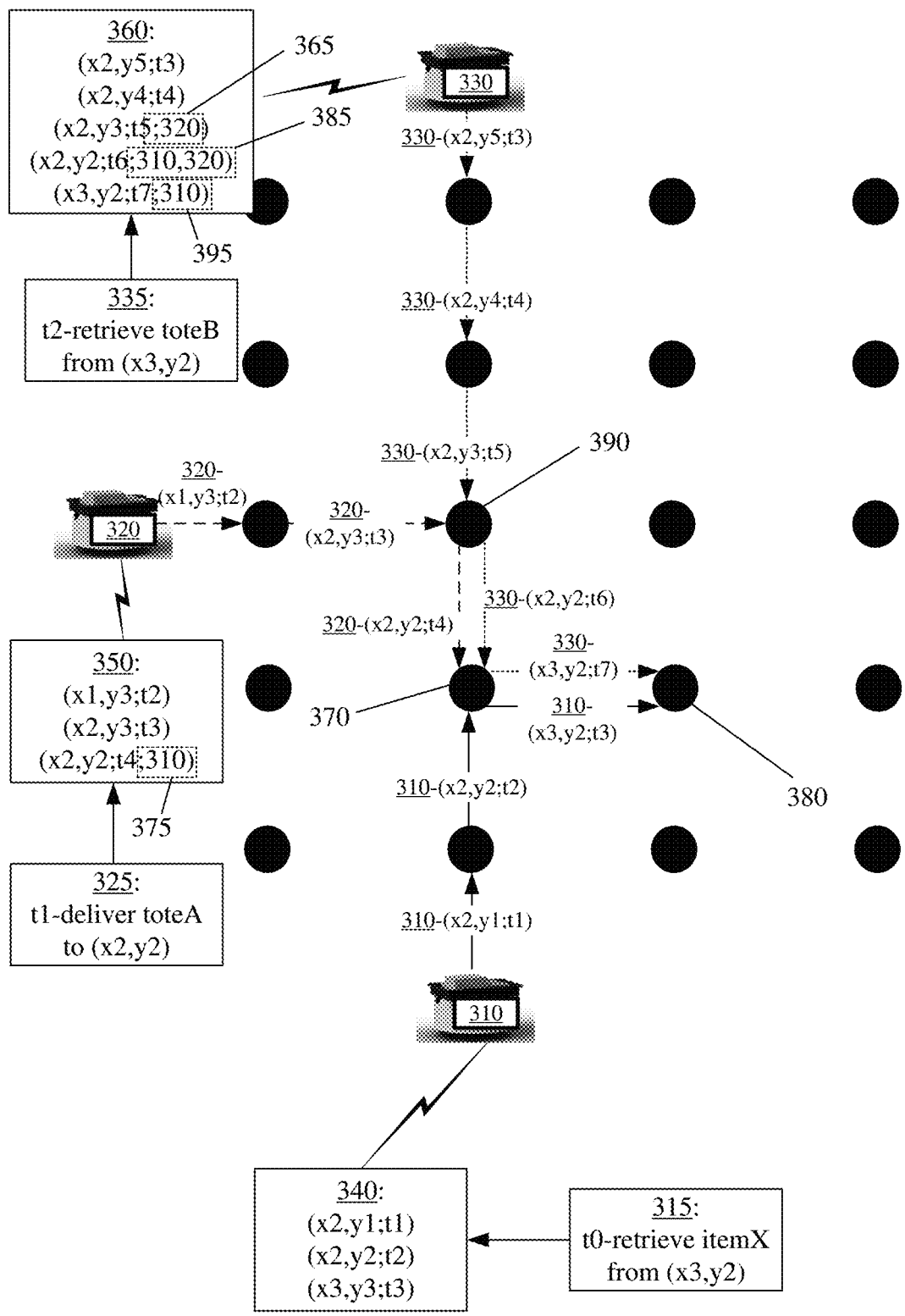
FIG. 3 illustrates examples of generating spatiotemporal plans for controlling robotic navigation in accordance with some embodiments.

FIG. 3 illustrates examples of generating spatiotemporal plans for controlling robotic navigation in accordance with some embodiments. The figure illustrates three different robots 310, 320, and 330 operating in a common site. The figure further illustrates different tasks 315, 325, and 335 that are assigned to robots 310, 320, and 330 at different times.

In response to assignment of first task 315 to first robot 310, first spatiotemporal plan 340 may be generated to control movements of first robot 310 in completing first task 315. First spatiotemporal plan 340 may be shared with other robots 320 and 330 when each robot 310, 320, and 330 generates its own spatiotemporal plan.

In some embodiments, first robot 310 may issue a message to other robots 320 and 330 upon initiating navigation according to first spatiotemporal plan 340. The message may provide first spatiotemporal plan 340 to other robots 320 and 330, and in doing so, reserve the different points in space at the different time intervals so that other robots 320 and 330 do not plan conflicting trajectories.

When the central planner generates first spatiotemporal plan 340 for first robot 310, first robot 310 may issue a message to the central planner upon initiating navigation according to first spatiotemporal plan 340. In this case, the message indicates that first spatiotemporal plan 340 is kinematically feasible and can be completed by first robot 310. In response, the central planner reserves the different points in space at the different time intervals for first robot 310 so there is no conflicting access when generating spatiotemporal plans for other robots 320 and 330.

To simplify FIG. 3, the time intervals for each spatiotemporal plan (e.g., 340) are shown as particular points in time by which a robot is to access a particular point in space. Also, it is assumed in FIG. 3 that robots 310, 320, and 330 are not engaged in performing prior tasks. Therefore, there may be no space or time contention when generating first spatiotemporal plan 340. Accordingly, first robot 310 can move through the most direct route to a desired first destination based on first spatiotemporal plan 340 reserving access to points in space along the most direct route to the desired first destination at different points in time. If first robot 310 was engaged in executing a previous spatiotemporal plan, first spatiotemporal plan 340 may be generated based on the position of first robot 310 at the final point in space specified by the previous spatiotemporal plan.

In response to assignment of second task 325 to second robot 320, second spatiotemporal plan 350 may be generated to control movements of second robot 320 in completing second task 325 while accounting for the reserved points in space at the different time intervals for the earlier generated first spatiotemporal plan 340. As shown in FIG. 3, first and second spatiotemporal plans 340 and 350 allow first and second robots 310 and 320 to occupy the same point in space (e.g., 370) at different points in time or time intervals without conflict, without the robots having to provide continual updates of their locations to one another, and without unexpected collisions to route around. Second spatiotemporal plan 350 may be provided to the central planner or may be shared with other robots 310 and 330.

Spatiotemporal plan 360 for third robot 330 may be generated in a similar manner. Assuming that tasks 315, 325, and 335 are assigned to robots 310, 320, and 330 in sequential order, generating spatiotemporal plan 360 for third robot 330 may include planning a path for execution of third task 335 that accounts for and does not conflict with the different points in space and time that will be accessed by the other two robots 310 and 320 based on the earlier generated spatiotemporal plans 340 and 350 for robots 310 and 320. Consequently, the trajectory taken by third robot 330 may include traversing points in space 370, 380, and 390 that other robots 310 and 320 may also traverse before or after third robot 330.

Precedence ordering may be specified after each or all of spatiotemporal plans 340, 350, and 360 are defined. To specify the precedence ordering, plans 340, 350, and 360 are scanned for same or common resources that are to be accessed by robots 310, 320, and 330. When spatiotemporal plans 340, 350, and 360 specify the same or common resources, the spatiotemporal plan generation may include providing a precedence ordering with which one or more robots 310, 320, and 330 may access the same or common resources should there be a failure or other event that causes one robot to not access a resource by an allotted time in the spatiotemporal plan executed by that robot.

For instance, spatiotemporal plans 350 and 360 have robots 320 and 330 accessing space 390 at different times. Spatiotemporal plan 350 calls for robot 320 to access space 390 no earlier than or within time interval t=3. Spatiotemporal plan 360 calls for robot 330 to access space 390 no earlier than or within time interval t=5. Accordingly, there should be no conflict at space 390 if robots 320 and 330 complete objectives in their respective spatiotemporal plans 350 and 360 by the times or time intervals provided for those objectives in plans 350 and 360. Nevertheless, actual operation of robots 320 and 330 may deviate from the expected operation set forth in spatiotemporal plans 350 and 360. Accordingly, a precedence ordering may be added to plans 350 and/or 360. For instance, since robot 330 is expected to access space 390 after robot 320, spatiotemporal plan 360 for robot 330 may include precedence order 365 for the waypoint or objective associated with space 390. Precedence order 365 permits robot 330 to access space 390 in the allotted time or time interval after robot 320 has accessed space 390.

Precedence orders are also specified for shared access to space 370 by robots 310, 320, and 330. For instance, spatiotemporal plan 350 for robot 320 may include precedence order 375 to ensure that robot 310 accesses space 370 before robot 320, and spatiotemporal plan 360 for robot 330 may include precedence order 385 to ensure that robot 310 accesses space 370 before robot 320, and robot 320 accesses space 370 before robot 330. Similarly, spatiotemporal plan 360 may include precedence order 395 to ensure that robot 310 accesses space 380 before robot 330 is permitted to access space 380.

The spatiotemporal planning may be continually performed as new tasks arrive. For example, the robots may include inventory retrieval robots, and the tasks may include retrieving totes or objects associated with incoming customer orders. The tasks may be assigned to the robots with the greatest availability, the robots with physical proximity to the task destinations, or based on other criteria.

Related tasks may be bundled and included as part of a single spatiotemporal plan that is provided to a single robot, or different spatiotemporal plans that are provided to the same robot. The bundling can reduce congestion and decrease the number of robots that need access to the same resource. For example, rather than generate two different spatiotemporal plans to have two different robots traverse the same points in space to arrive at adjacent locations and retrieve adjacent objects, the tasks may be bundled into a single spatiotemporal plan that is executed by a single robot traversing the points in space and retrieving the adjacent objects. Accordingly, some embodiments may perform a preplanning operation. The preplanning operation may determine how to assign tasks across the robots, and whether any tasks should be batched for execution by a single robot before generating the spatiotemporal plans for controlling the movement of the robots.

As noted above, unexpected obstacles, failures, or unforeseen conflicts may disrupt the spatiotemporal robotic navigation, and may cause one or more robots to unsuccessfully complete one or more of their spatiotemporal plan objectives in the allotted time intervals. In other words, actual operation of the robots may not coincide with the expected operation specified as part of the spatiotemporal plan.

The robots may perform dynamic spatiotemporal robotic navigation to correct for these unexpected obstacles, failures, or unforeseen conflicts. The dynamic spatiotemporal robotic navigation may be initiated based on the exchange of messages between the robots and/or the central planner as the robots successfully and/or unsuccessfully execute the different objectives or waypoints from their respective spatiotemporal plans. The dynamic spatiotemporal robotic navigation may also be initiated based on the precedence ordering.

In some embodiments, the robots may distribute messaging to indicate successful and/or unsuccessful completion of a spatiotemporal plan objective by an allotted time. For example, a message distributed by a robot, in response to a successfully executed waypoint, may indicate that one or more points in space associated with the waypoint have been vacated by the messaging robot at the time of the message. As another example, a message distributed by the robot, in response to an unsuccessfully executed waypoint, may indicate that the messaging robot continues to access one or more points in space past the time interval allotted to the robot in the spatiotemporal plan executed by that robot. The message may further indicate a time shift (e.g., new points in time or a delta) for other points in space that the messaging robot has yet to access in executing the current waypoint or other waypoints from the robot's spatiotemporal plan.

In some embodiments, a robot may not distribute messaging to the central planner or other robots when the robot successfully executes different waypoints of a spatiotemporal plan (e.g., arrive at a particular point in space within an allotted time interval). In some such embodiments, the robots can operate under the assumption that, if no message is sent, the robots are moving according to their respective spatiotemporal plans, and no conflicts will occur so long as the robots continue moving in the non-conflicting planned manner.

However, if a robot stops operating, loses power, or otherwise goes offline, the assumptions may be incorrect and conflicts may arise. Accordingly, in some embodiments, a robot may distribute messaging to the other robots or central planner when a robot successfully executes each objective or waypoint of a spatiotemporal plan.

A robot may also exchange messaging with other robots or the central planner when the robot cannot successfully execute a waypoint of a spatiotemporal plan. Unsuccessful execution of a waypoint may include a robot, because of some unexpected obstacle, failure, or unforeseen conflict, failing to arrive at a particular point in space by a particular point in time or time interval that is provided in the spatiotemporal plan executed by that robot. The message allows the other robots to take preemptive action and initiate dynamic spatiotemporal navigation should their original spatiotemporal plans call for accessing the space occupied by the failing robot, or other space that the failing robot may access at a later time than was called for in the original spatiotemporal plan.

The precedence ordering can also be used to initiate the dynamic spatiotemporal robotic navigation in the absence of any messaging from the robots indicating successful or unsuccessful execution of a plan objective. For instance, a first robot may perform dynamic spatiotemporal robotic navigation when a second robot with precedence to access a shared resource does not do so, and/or does not provide messaging that indicates successful or unsuccessful access of the shared resource within a threshold amount of time (e.g., the second robot does not access the shared resource by the time interval allotted in the spatiotemporal plan of the first robot for the first robot to access the shared resource).

In some embodiments, the dynamic spatiotemporal robotic navigation may allow the robots to work around a failure such that there is no impact on the execution of the spatiotemporal plans being executed the robots. For instance, the dynamic spatiotemporal robotic navigation may allow a robot to work around a failure by temporarily bypassing unavailable or conflicted resources specified in a spatiotemporal plan via accessing a non-conflicting, adjacent, and available set of resources that may not be specified in the spatiotemporal plan, but that are dynamically identified as a viable workaround. In doing so, the robot may temporarily deviate from execution of its spatiotemporal plan in order to bypass or correct for a failure, before resuming execution of the spatiotemporal plan. The dynamic spatiotemporal robotic navigation may further allow the robot to work around the failure by accelerating execution of a waypoint or objective where the failure or conflict exists in order to create a time buffer that provides the robot time to perform the workaround via the non-conflicting, adjacent, and available set of resources, and still complete the waypoint or objective within the time interval allotted in the spatiotemporal plan.

For instance, a first robot may receive a message from a second robot. The message may indicate that the second robot was unable to execute an objective from the spatiotemporal plan being executed by the second robot. The message may further identify one or more shared resources that are affected by the failed objective execution. In other words, the message may identify one or more shared resources that are still being accessed by the second robot.

The first robot may determine that the next objective in its spatiotemporal plan involves accessing the conflicting shared resource. Accordingly, the first robot may adjust its kinematics to move faster before and/or after needing access to the conflicting shared resource. The faster movement may create a time buffer with which the first robot can temporarily reroute and access a non-conflicting, adjacent, and available resource, and still execute the objective in the time interval allotted by the first robot's spatiotemporal plan.

The granularity of the objectives can be used to control the amount of messaging that is exchanged by the robots. For instance, the number of exchanged messages may increase when the objectives correspond to individual points in space, and messages are exchanged upon successful and/or unsuccessful completion of each objective. Similarly, the number of exchanged messages may decrease when the objectives correspond to a collection of points in space or every Nth point in space defined in the spatiotemporal plan, and messages are exchanged upon successful and/or unsuccessful completion of each objective.

The dynamic spatiotemporal robotic navigation may also be performed by a first robot in response to failures experienced by the first robot during execution of a particular objective, as well as in response to unsuccessful objective execution (e.g., a failure) by another second robot that is detected because of the precedence ordering, or by sensors of the first robot during execution of the particular objective. For instance, if the second robot was to stop operating, lose power, or go offline, the second robot may be unable to signal unsuccessful execution of an objective to other robots or the central planner. The first robot may detect the failure based on the precedence ordering. Specifically, the spatiotemporal plan of the first robot may include an objective with a precedence order identifying the second robot as having precedence over the first robot to access a shared resource. If the first robot does not receive messaging from the second robot that indicates that the second robot has accessed the shared resource, the precedence order may cause the first robot to perform the dynamic spatiotemporal robotic navigation. The first robot may also detect the failure of the second robot with its own sensors (e.g., camera, LiDAR, radar, depth camera, etc.) when executing an objective that brings the first robot in proximity to the second robot and the second robot is accessing or occupying a shared resource that is supposed to be available to the first robot during the objective execution.

Figure 4:
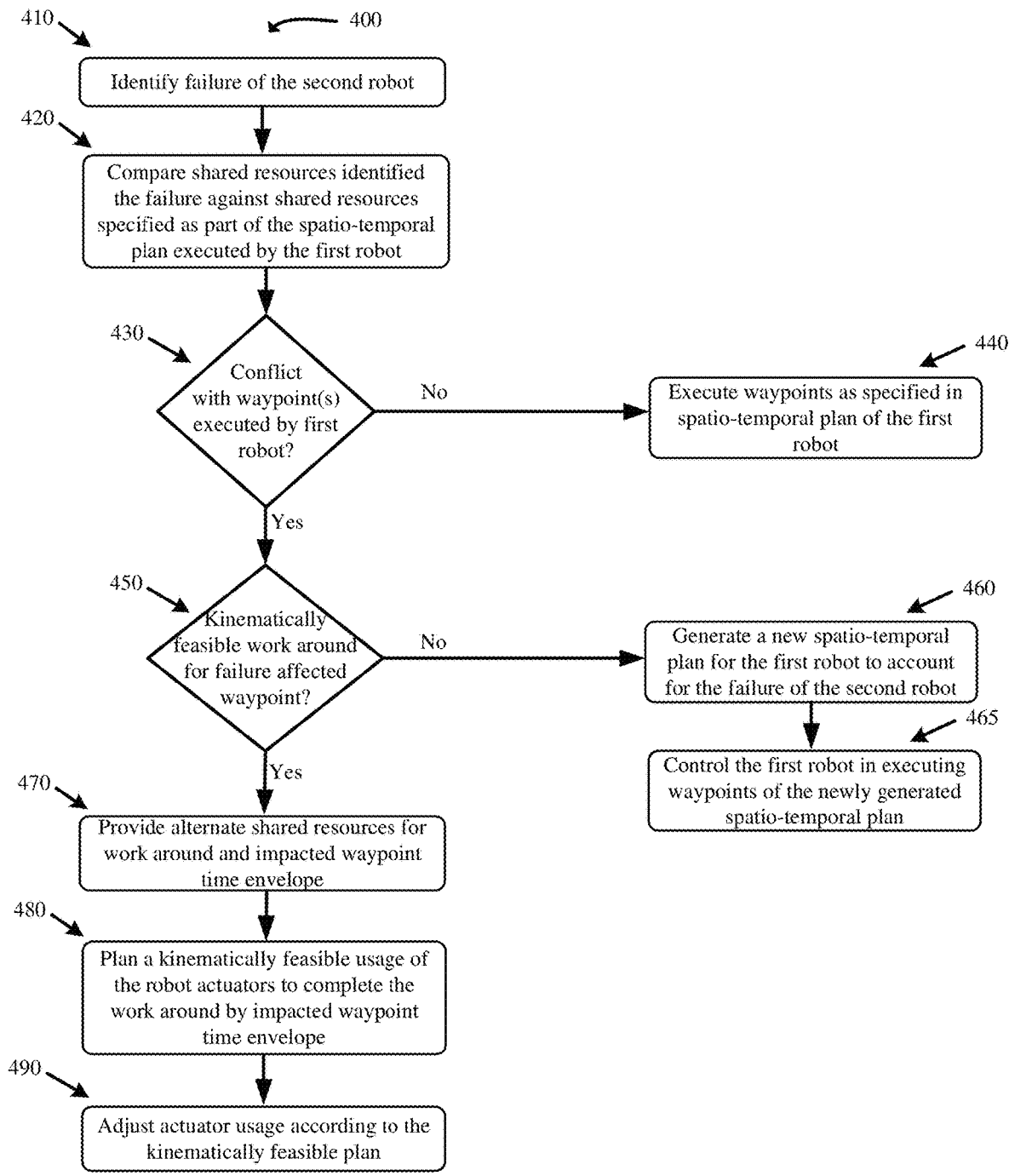
FIG. 4 presents a process for dynamic spatiotemporal robotic navigation that accounts and adjusts for failures of other robots during the execution of a spatiotemporal plan.

FIG. 4 presents a process 400 for dynamic spatiotemporal robotic navigation that accounts and adjusts for failures of other robots during the execution of a spatiotemporal plan. Process 400 may be performed by a first robot or the central planner in response to a failure by a second robot.

Process 400 may include identifying (at 410) the failure of the second robot. The first robot or central planner may identify the failure in response to messaging distributed by the second robot, a precedence order that includes the second robot and that remains incomplete, a lack of messaging from the second robot, or the first robot detecting the failure, using sensors of the first robot, and/or reporting the failure to the central planner. The failure may be associated with at least a current point in time and one shared resource (e.g., point in space) that the second robot continues to access past a time interval specified in the spatiotemporal plan executed by the second robot. The failure may also be associated with other shared resources that the second robot may access, and/or new points in time or a fixed or moving delay at which the second robot expects to access the other shared resources because of the failure.

Process 400 may include comparing (at 420) the one or more shared resources identified from the failure of the second robot against shared resources that are specified as part of the spatiotemporal plan being executed by the first robot. Based on the comparison, the process 400 may determine (at 430) whether the failure may create a conflict with execution of a waypoint or objective from the spatiotemporal plan of the first robot. A conflict may arise when the failure of the second robot prevents the first robot from accessing a shared resource in an allotted amount of time in the first robot's spatiotemporal plan.

In response to determining (at 430—No) that the failure does not create a conflict with the spatiotemporal plan being executed by the first robot, the first robot may continue operating according to its spatiotemporal plan without deviation. Specifically, the first robot may continue executing (at 440) waypoints from its spatiotemporal plan. To do so, the first robot may access different shared resources in order to execute each particular waypoint within the time interval allotted for the particular waypoint.

In response to determining (at 430—Yes) that the failure may create a conflict with the spatiotemporal plan of the first robot, process 400 may include determining (at 450) whether the first robot can perform a kinematically feasible workaround for the spatiotemporal plan waypoint that is affected by the second robot failure. A kinematically feasible workaround may include the first robot working around the failure of the second robot in order to successfully complete the impacted waypoint in the time interval allotted in the spatiotemporal plan for the impacted waypoint.

A kinematically feasible workaround may include the first robot identifying one or more alternate shared resources at the expected time of conflict. The alternate shared resources may be similar and adjacent to the conflicting resource(s) that is specified as part of an objective from the first robot's spatiotemporal plan, but that is not accessible because of the failure by the second robot. The first robot may identify the one or more alternate resources from the spatiotemporal plans being executed by the other robots. Specifically, the spatiotemporal plans being executed by the other robots identify which resources will be accessed at different time intervals. Accordingly, the first robot can also determine which resources will be available (e.g., not accessed by other robots) at different time intervals. If alternate shared resources are found, the first robot may determine, based on constraints and performance parameters of the first robot's actuators, whether the first robot can access the alternate shared resources and still complete the objective in the time interval allotted by the spatiotemporal plan. The time to access the alternate resources and complete the objective based on the constraint and performance parameters of the robot may be determined by a kinematics controller of the first robot. No kinematically feasible workaround exists if alternate shared resources (e.g., resources that are similar and adjacent to the conflicting resources) are unavailable during the time interval allotted for the impacted objective.

Figure 5:
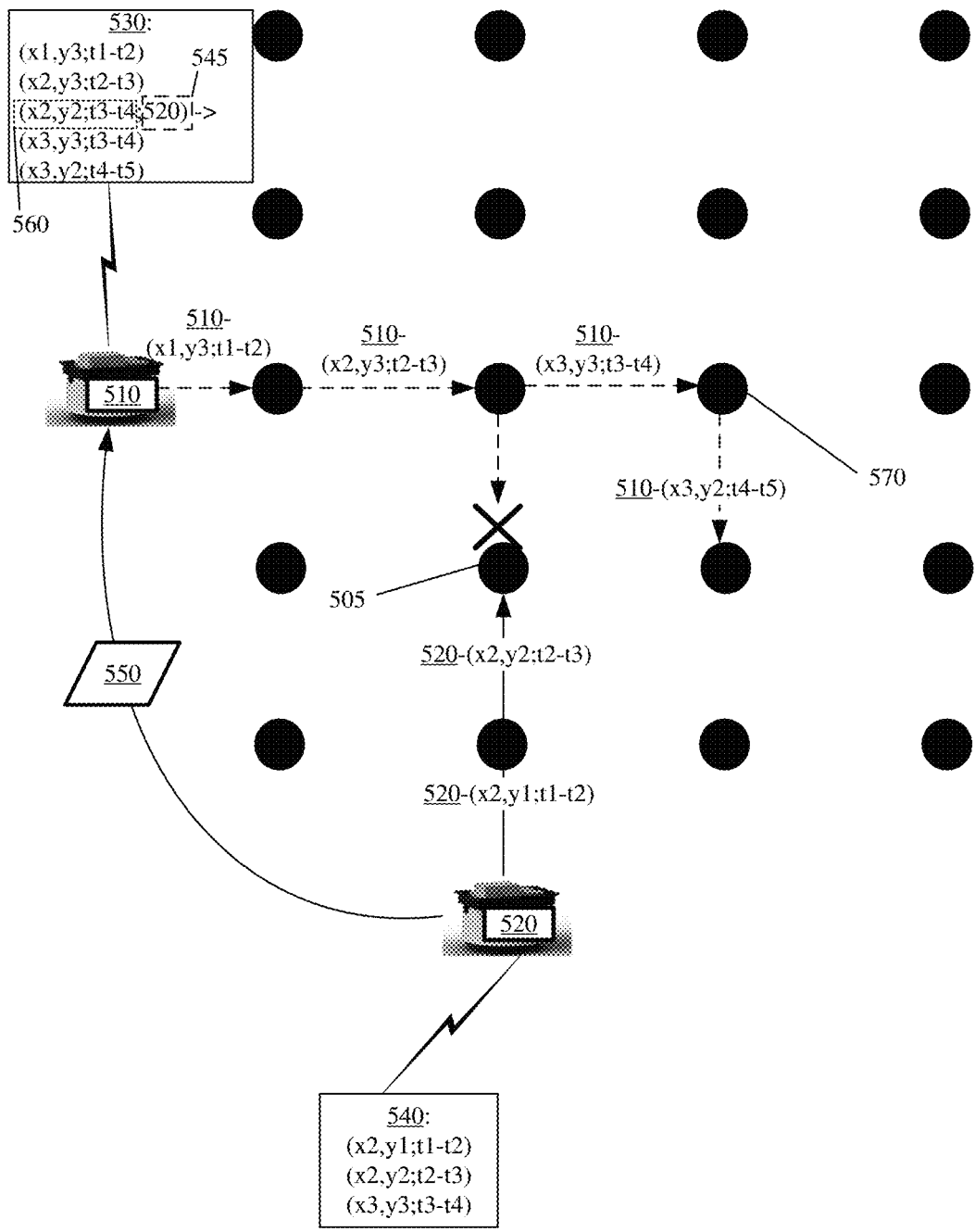
FIG. 5 provides an example of a potential conflict between first and second robots because of a failure by the first robot.

FIG. 5 provides an example of a potential conflict at space 505 between first robot 510 and second robot 520 because of a failure by second robot 520. Spatiotemporal plan 530 of first robot 510, and spatiotemporal plan 540 of second robot 520 both include a waypoint that traverses space 505 at different time intervals. Second robot 520 accesses space 505 first but experiences a delay or failure that prevents second robot 520 from clearing the space within a time interval (e.g., t2-t3) specified for the waypoint in spatiotemporal plan 530.

Second robot 520 may send a message 550 to first robot 510 to announce the failure. In some embodiments, second robot 520 may be unable to send the message because of a loss of network connectivity or power. In some such embodiments, first robot 510 may detect the failure without receiving messaging from second robot 520 because of precedence order 545 specified in spatiotemporal plan 540. Precedence order 545 may prevent first robot 510 from accessing space 505 until second robot 520 has accessed space 505. If first robot 510 does not receive a message that indicates second robot 520 has accessed space 505 by the time interval first robot 510 is allotted to access or complete its access of space 505 (e.g., t3-t4), then the failure is detected and the dynamic spatiotemporal robotic navigation may be performed.

First robot 510 may determine that the second robot 520 failure affects waypoint 560 in spatiotemporal plan 530. First robot 510 may obtain the spatiotemporal plans being executed by other robots that operate in the same site. From the spatiotemporal plans, first robot 510 may determine if available, adjacent, and similar space 570 is available during the allotted time interval so that first robot 510 may avoid space 505 and workaround the failure by second robot 520. The workaround is kinematically feasible when first robot 510 can successfully access space 570 instead of space 505 in the same time interval allotted for first robot 510 to access space 505.

With reference back to FIG. 4 and in response to determining (at 450—No) that there is no kinematically feasible workaround, the first robot may not be able to work around the detected failure of the second robot and still successfully execute the waypoints from the spatiotemporal plan executed by the first robot. Accordingly, process 400 may include generating (at 460) a new spatiotemporal plan for the first robot that accounts for the failure of the second robot, subsequent delayed resource access by the second robot, and/or shared resource access by other robots at different time intervals as provided in the spatiotemporal plans of the other robots. In generating (at 460) the new spatiotemporal plan, process 400 may provide a new path with which the first robot completes a task associated with the previous spatiotemporal plan or a newly assigned task. The process 400 may further include controlling (at 465) the first robot in executing waypoints of the newly generated spatiotemporal plan.

In response to determining (at 450—Yes) that there may be a kinematically feasible workaround, process 400 may include providing (at 470), to the kinematics controller of the first robot, alternate shared resources (e.g., available, non-conflicting, similar, and adjacent shared resources to the resources affected by the second robot's failure) for working around the failure, and/or information (e.g., the time envelope) from the waypoint of the first robot's spatiotemporal plan that is impacted by the second robot's failure. For instance, the kinematics controller of the first robot may receive x-y coordinates, fiducials, or other identifiers identifying a path for the workaround, and a time interval associated with the impacted waypoint by which to execute the workaround without deviating from the spatiotemporal plan.

Process 400 may further include planning (at 480), with the kinematics controller of the first robot, a kinematically feasible usage of the first robot's actuators to work around the detected failure. Process 400 may adjust (at 490) actuator usage according to the kinematically feasible plan upon the first robot arriving at and executing a workaround for the waypoint impacted by the second robot's failure.

Although process 400 is described with an example of a failure by another robot, process 400 may also be performed in response to any unexpected failure, obstacle, or conflict that is encountered or detected by the first robot in executing its spatiotemporal plan. This may include unexpected human interactions, falling objects, system interruptions, etc. For example, a human worker may unexpectedly walk in front of the first robot as it is traversing a path segment associated with a particular waypoint. The first robot may perform process 400 in order to work around the obstacle that the human presents.

In some embodiments, the spatiotemporal plans of the robots may be generated to account for humans. In other words, the spatiotemporal robotic navigation can provide non-conflicting access to shared resources based on spatiotemporal plans that account for usage of the same shared resources by other robots and humans at different points in time. For instance, human movements may be confined to certain pathways or areas. A different set of kinematics may be associated with each human based on past performance of the human. For example, a first human may be tracked to walk at a first speed, and pick items from a picking location at a second speed. A second human may be tracked to walk at a third speed, and pick items from a picking location at a fourth speed. Accordingly, a pseudo-spatiotemporal plan may be generated for each human based on tasks the humans are assigned to perform. In a similar manner, the pseudo-spatiotemporal plan for each human may specify different shared resources that may be accessed at different points in time based on the kinematics of the human. The accessed resources at different time intervals specified by these pseudo-spatiotemporal plans as well as the spatiotemporal plans of the robots may be accounted for when generating a new spatiotemporal plan for a particular robot. In some embodiments, the pseudo-spatiotemporal plans may be provided to devices carried by the humans to instruct the humans on paths to traverse and times with which to do so.

The dynamic spatiotemporal robotic navigation allows the robots to operate autonomously without continuously accounting for the locations of the other robots and workers operating in the same space, continuously updating paths, planning paths on a continuous basis, or continuously performing collision avoidance as the robots near one another. Such autonomous robotic operation reduces the number of unnecessary preemptive avoidance maneuvers that the robots perform as most collisions are accounted for and avoided at the time of plan generation. Consequently, the robots may operate more efficiently and with closer proximity to one another and with fewer adjustments as the robots execute their various tasks.

Each robot has a kinematics controller for dynamic spatiotemporal robotic navigation. The kinematics controller of a robot may be specialized hardware. For instance, the kinematics controller may be implemented as an application-specific integrated circuit. In some embodiments, the kinematics controller may be specialized software that is stored to a non-transitory computer-readable medium of the robot. The specialized software may include a set of processor-executable instructions that can be executed by one or more processors of the robot.

The kinematics controller may control different actuators of the robot according to a spatiotemporal plan. More specifically, the kinematics controller may manipulate the actuators to produce physical movements that execute the different waypoints of a spatiotemporal plan in the time allotted for each waypoint. The physical movements may include movements of the robot or mechanical elements of the robot.

The actuators may include hydraulic, electrical, combustion, or other motors or engines associated with locomotion, lifts, and/or component that generate driving, pushing, or pulling forces. The actuators may also include mechanical arms, vacuums, suction elements, magnets, levers, pistons, movable platforms, and/or other mechanical elements of the robot. The kinematics controller may control these and other actuators by regulating the voltage and/or current provided to the actuators at any point in time. In doing so, the kinematics controller can change the speed with which the robot moves, when and how a robot turns, and/or other physical movements of the robot.

In some embodiments, the kinematics controller may access different sensors of the robot to facilitate the control of the actuators. For example, the kinematics controller may access one or more cameras, accelerometers, LiDAR, radar, depth cameras, magnetometer, gyroscope, wheel rotational sensor, light sensor (e.g., photoresistor or photovoltaic cell), microphone, temperature sensor, contact sensor, proximity sensor, pressure sensor, tilt sensor, inertial measurement unit, voltage sensor, electric current sensor, clock, and/or other sensors that may be available on a robot. The kinematics controller, based on the sensor output, may identify whether the robot is on schedule to a complete a task or waypoint by the time envelope allotted for that task or waypoint, and may speed or slow down execution accordingly. The kinematics controller may also determine whether execution of a waypoint is unsuccessful or successful based on the sensor output.

The robots can therefore be any autonomous machine with mechanical movements. In preferred embodiments, the robots represent object picking, object retrieval, or object delivery robots that operate in a warehouse. However, the spatiotemporal robotic navigation, the dynamic spatiotemporal robotic navigation, and the usage or execution of the spatiotemporal plans can be adopted by other autonomous machines such as autonomous vehicles or automobiles. For instance, a spatiotemporal plan may represent a path by which a vehicle navigates city streets to reach a destination, and the waypoints represent different intersections or streets that the vehicle drives through at allotted time intervals. If a particular vehicle operates according to a spatiotemporal plan that is generated based on the plans being executed by other vehicle, the particular vehicle can move without conflict.

Figure 6:
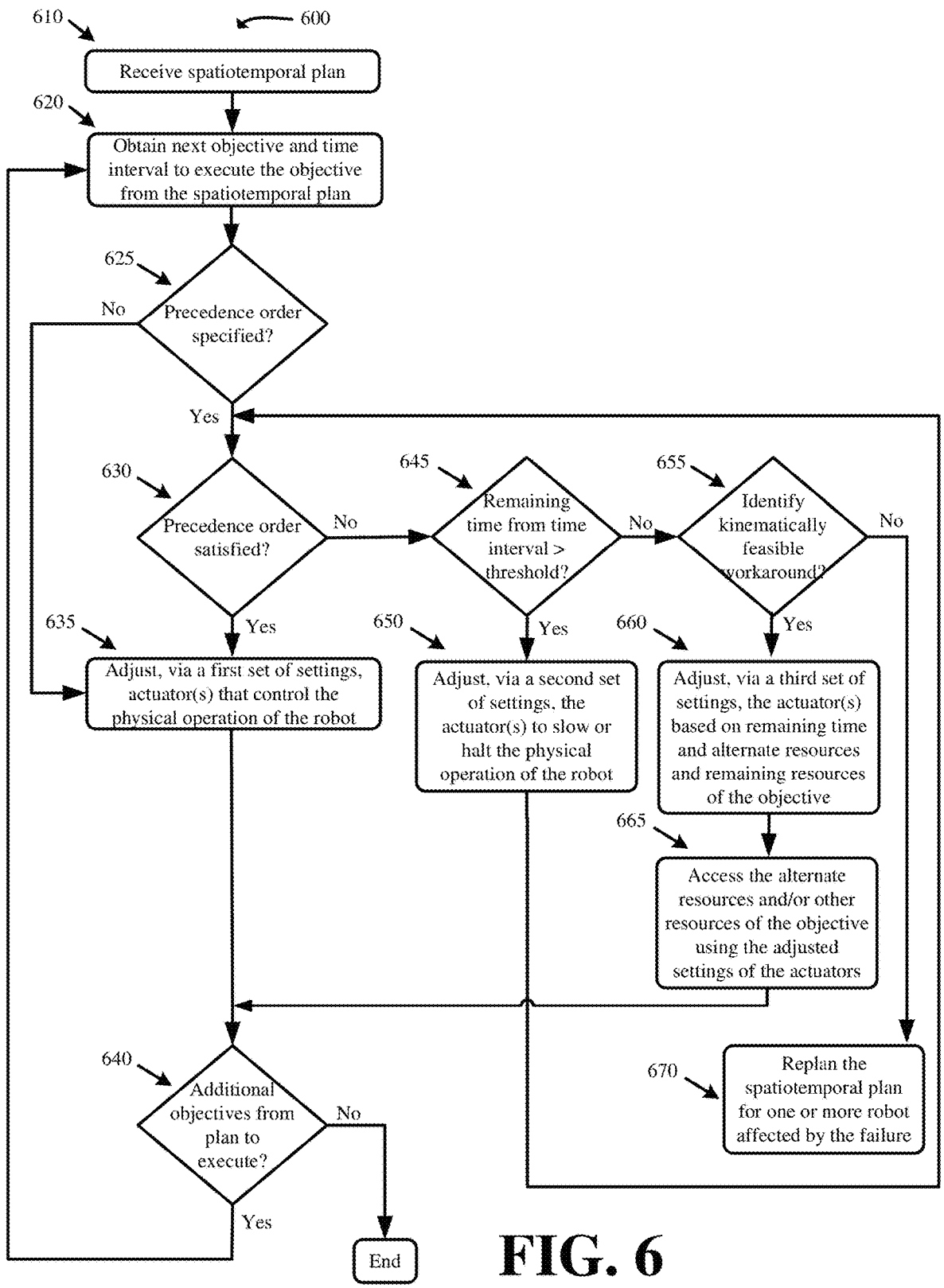
FIG. 6 presents a process for dynamic spatiotemporal robotic navigation in accordance with some embodiments.

FIG. 6 presents a process 600 for dynamic spatiotemporal robotic navigation in accordance with some embodiments. Process 600 may be performed by a first robot from a set of robots that operate in a same site.

Process 600 may commence in response to the first robot receiving (at 610) a spatiotemporal plan to execute. The spatiotemporal plan may include different objectives and a different time interval by which the first robot is to execute each objective. Execution of each objective involves the first robot accessing a set of resources within the allotted time interval for that objective.

Process 600 includes obtaining (at 620) a next objective from the spatiotemporal plan and a time interval within which the first robot is to execute the objective. Process 600 may include determining (at 625) if a precedence order is specified with the obtained objective or any one or more resources that are to be accessed during execution of the objective.

In response to determining (at 625—Yes) that a precedence order is specified, process 600 may include determining (at 630) whether the precedence order has been satisfied. The determination for whether the precedence order has been satisfied may be based on signaling or messaging from other robots or a central planner that indicates the other robots identified in the precedence order have completed accessing the one or more resources from the obtained objective.

In response to determining (at 630—Yes) that the precedence order is satisfied or in response to determining (at 625—No) that no precedence order is specified, process 600 may include adjusting (at 635), via a first set of adjustments, one or more actuators that control the physical operation of the first robot. In particular, the kinematics controller of the first robot adjusts the settings to control the speed with which the first robot accesses each resource from the obtained objective so that the objective can be completed in the allotted time interval. Adjusting the settings may include activating or deactivating one or more actuators, regulating an amount of power that is supplied to the one or more actuators, regulating movements of the one or more actuators, and/or changing other characteristics or parameters of the one or more actuators that impact the physical operation of the first robot. The settings may be continually adjusted by the kinematics controller to increase or decrease the speed of different physical movements and/or the physical operation of the robot to modify how different resources associated with the current objective are accessed while ensuring that the entire set of resources are accessed within the time interval allotted in the spatiotemporal plan for the objective. Process 600 may then include determining (at 640) if additional objectives remain in the spatiotemporal plan.

In response to determining (at 640—Yes) that at least one additional objective remains, process 600 may include obtaining (at 620) and executing the next objective. In response to determining (at 640—No) that no additional objectives remain, process 600 may end or restart with execution of a different spatiotemporal plan.

The first robot may detect a failure by another robot in response to determining (at 630—No) that the precedence order is not satisfied. The first robot may take different actions depending on the amount of time from the time interval allotted in the spatiotemporal plan for the first robot to complete the obtained objective. Accordingly, process 600 may include detecting (at 645) if remaining time in the time interval for the obtained objective exceeds a time threshold. The time threshold may be a dynamic value. The time threshold may correspond to a time buffer included with the objective's time interval that may be exhausted without affecting the ability of the first robot to access the resources and execute the obtained objective within the allotted time interval.

If the remaining time exceeds (at 645—Yes) the time threshold, then the first robot may wait for the precedence order to complete. For instance, another robot identified in the precedence order may still be operating, but experienced a slowdown that caused it to miss a time interval for accessing the now conflicted resource. In this case, process 600 may include adjusting (at 650), via a different second set of adjustments, the one or more actuators in order to slow or halt the physical operation of the first robot to allow another robot that is identified in the precedence order first access to the resources involved as part of the precedence order. Process 600 may then wait some amount of time before checking (at 630) if the waiting has resulted in the precedence order being satisfied.

If the remaining time does not exceed (at 645—No) the time threshold, then the first robot may attempt to identify (at 655) and perform a kinematically feasible workaround that allows the first robot to avoid the conflicted resources through alternate resources that are not used by other robots and that allow the first robot to still complete the objective in the allotted time interval. In this case, the detected failure is more severe and the first robot may fail in its execution of the spatiotemporal plan if it cannot workaround the failure. In some embodiments, the first robot references spatiotemporal plans being executed by the other robots to determine if the alternate resources are available within the time interval of the obtained objective, before determining if the available alternate resources provide a kinematically feasible workaround.

If a kinematically feasible workaround is identified (at 655—Yes), process 600 may include temporarily deviating from the spatiotemporal plan by adjusting (at 660), via a third set of settings, the one or more actuators of the first robot in order to access (at 665) alternate resources of the kinematically feasible workaround and/or other resources of the objective in the remaining time of the allotted time interval while avoiding the detected failure. In this case, the adjusted (at 660) settings may accelerate physical operation of the first robot to make up for an exhausted time buffer and/or to access the alternate resources that may be more or less than the conflicted resources specified as part of the objective being executed. In successfully completing the objective via the kinematically feasible workaround, process 600 may include determining (at 640) if additional objectives remain in the spatiotemporal plan and executing the remaining objectives.

If a kinematically feasible workaround is not identified (at 655—No), process 600 may include aborting execution of the current spatiotemporal plan because the objectives can no longer be completed in the allotted time intervals, and attempting to do so may create a cascading set of failures or conflicts that would interfere with the execution of other spatiotemporal plans by the other robots. In this case, process 600 may include replanning (at 670) the spatiotemporal plan for the first robot, the robot creating the failure, and/or other robots that may be similarly affected and can no longer complete their spatiotemporal plan objectives. Replanning may include creating a new spatiotemporal plan that accounts for the detected failure as well as used resources at different time intervals as specified in the spatiotemporal plans being executed by other robots. In some embodiments, replanning may include changing the existing spatiotemporal plan to reset time intervals for remaining objectives and/or modify one or more objectives affected by the failure.

Server, device, and machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 7:
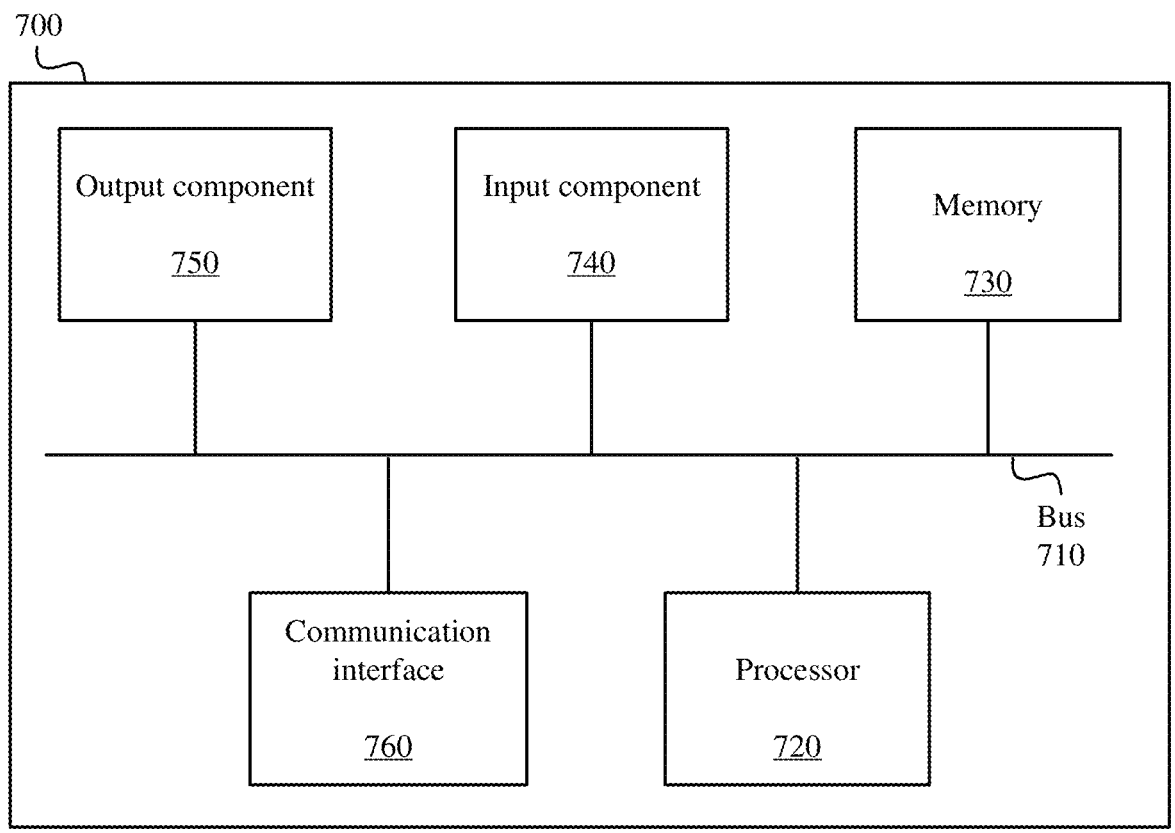
FIG. 7 illustrates example components of one or more devices, according to one or more embodiments described herein.

FIG. 7 is a diagram of example components of device 700. Device 700 may be used to implement certain of the devices described above (e.g., the central planner, the robots, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, WiFi radio, LTE radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
mapping a plurality of resources in a site, wherein the plurality of resources are used by a plurality of workers during completion of different tasks;
receiving a first task for completion by a first worker of the plurality of workers;
detecting a first set of the plurality of resources with which to complete the first task in a least amount of time;
reserving, as part of a first plan, each resource of the first set of resources with a different temporal element;
controlling operation of the first worker in completing the first task by the different temporal element specified for each resource of the first set of resources in the first plan;
receiving a second task for completion by a second worker of the plurality of workers;
detecting a second set of the plurality of resources with which to complete the second task in a least amount of time without temporal conflict with the first set of resources reserved for the first plan;
reserving, as part of a second plan, each resource of the second set of resources with a different temporal element that is not conflicting with the temporal element of a common resource also specified as part of the first plan; and
controlling operation of the second worker in completing the second task by the different temporal element specified for each resource of the second set of resources in the second plan.

2. The method of claim 1,
wherein reserving each resource of the second set of resources comprises reserving a particular resource with a first temporal element corresponding to a first time, and
wherein the particular resource is reserved as part of the first set of resources with a second temporal element corresponding to a second time that is different than the first time.

3. The method of claim 1 further comprising:
receiving a third task for completion by a third worker of the plurality of workers;
detecting a third set of the plurality of resources with which to complete the third task in a least amount of time without temporal conflict with the first set of resources reserved for the first plan and the second set of resources reserved for the second plan;
reserving, as part of a third plan, each resource of the third set of resources with a different temporal element that is not conflicting with the temporal element of a common resource also specified as part of the first plan or the second plan; and controlling operation of the third worker in completing the third task by the different temporal element specified for each resource of the third set of resources in the third plan.

4. The method of claim 1, wherein controlling operation of the first worker comprises:

monitoring that the first worker accesses each particular resource of the first set of resource by or within the temporal element specified for that particular resource.

5. The method of claim 1, wherein each particular resource of the first set of resources corresponds to a different waypoint in the site, and wherein the temporal element specified for each particular resource corresponds to a future time the particular resource is reserved for exclusive access by the first worker.

6. The method of claim 1, wherein the first worker is an autonomous robot, and wherein controlling operation of the first worker comprises adjusting actuators of the autonomous robot to cause the autonomous robot to access each resource of the first set of resources by the temporal element specified for each resource.

7. The method of claim 1 further comprising:

determining that the second worker is to access a particular resource of the first set of resources and the second set of resources before the first worker; and marking the particular resource in the first plan and in the second plan with a precedence ordering indicating that the second worker is to access the particular resource before the first worker.

8. The method of claim 7, wherein controlling operation of the first worker comprises:

halting the operation of the first worker in response to the first worker reaching the particular resource before the second worker;

receiving a message indicating that the second worker has accessed the particular resource; and continuing the operation of the first worker in response to receiving the message.

9. The method of claim 1 further comprising:

tracking different sets of the plurality of resources that have been reserved for other plans pending execution, and temporal elements specified for each resource of the different sets of resources;

determining available resources at different temporal elements that do not conflict with the different sets of resources at the temporal elements specified for the different sets of resources;

selecting at least a first group of available resources and a second group of available resources with which to complete the first task;

simulating performance of completing the first task using the first group of available resources and using the second group of available resources; and wherein detecting the first set of resources comprises defining the second group of available resources for the first plan based on the second group of available resources providing resulting in quicker completion of the first task than the second group of available resources.

10. The method of claim 1 further comprising:

receiving a set of messages from the first worker, each message of the set of messages comprising an identifier for a resource of the first set of resources and a timestamp; and monitoring operation of the first worker in completing the first task based on the timestamp and identifier of each message of the set of messages being within the temporal element for a resource that is identified by the identifier of each message.

11. The method of claim 1, wherein the first set of resources comprises a shortest path from a current position of the first worker to a first destination of the first task, and wherein the second set of resources comprises a shortest path from a current position of the second worker to a second destination of the second task that does not conflict with the first set of resources at common points in time.

12. The method of claim 1 further comprising:

receiving a third task for completion by the first worker after completion of the first task;

detecting a third set of the plurality of resources with which to complete the third task in a least amount of time from a starting position corresponding to a position of a last resource of the first set of resources;

reserving, as part of a third plan, each resource of the third set of resources with a different temporal element; and controlling operation of the first worker in completing the third task after successfully completing the first task and accessing the first set of resources by the different temporal element specified for each resource of the first set of resources.

13. The method of claim 1 further comprising:

determining unsuccessful execution of the first plan based on the first worker not accessing a particular resource of the first set of resources by the temporal element that is specified for the particular resource in the first plan;

determining that the unsuccessful execution of the first plan creates a conflict that prevents the second worker from accessing the particular resource of the second set of resources according to the temporal element that is specified for the particular resource in the second plan; and adjusting the operation of the second worker to workaround the conflict.

14. The method of claim 13, wherein adjusting the operation comprises:

selecting an available resource adjacent to the particular resource; and accessing the available resource instead of the particular resource during the temporal element that is specified for the particular resource in the second plan.

15. The method of claim 14, wherein selecting the available resource comprises:

scanning other plans to determine resources neighboring the particular resource that are reserved during the temporal element that is specified for the particular resource in the second plan; and identifying the available resource in response to determining that the available resource is not reserved by the other plans during the temporal element that is specified for the particular resource in the second plan.

16. The method of claim 13, wherein adjusting the operation comprises:

adjusting one or more of the temporal elements for resources of the second set of resources that are before the particular resource in the second plan or that are after the particular resource in the second plan.

17. The method of claim 13, wherein adjusting the operation comprises:
    discarding a first subset of the second set of resources that come after the particular resource in the second plan; and
    detecting a second subset of resources with which to complete the second task in a least amount of time while avoiding the conflict at the particular resource.

18. A device comprising:
    one or more processors configured to:
        map a plurality of resources in a site, wherein the plurality of resources are used by a plurality of workers during completion of different tasks;
        receive a first task for completion by a first worker of the plurality of workers;
        detect a first set of the plurality of resources with which to complete the first task in a least amount of time;
        reserve, as part of a first plan, each resource of the first set of resources with a different temporal element;
        control operation of the first worker in completing the first task by the different temporal element specified for each resource of the first set of resources in the first plan;
        receive a second task for completion by a second worker of the plurality of workers;
        detect a second set of the plurality of resources with which to complete the second task in a least amount of time without temporal conflict with the first set of resources reserved for the first plan;
        reserve, as part of a second plan, each resource of the second set of resources with a different temporal element that is not conflicting with the temporal element of a common resource also specified as part of the first plan; and
        control operation of the second worker in completing the second task by the different temporal element specified for each resource of the second set of resources in the second plan.

19. A non-transitory computer-readable medium, storing a plurality of processor-executable instructions to:
    map a plurality of resources in a site, wherein the plurality of resources are used by a plurality of workers during completion of different tasks;
    receive a first task for completion by a first worker of the plurality of workers;
    detect a first set of the plurality of resources with which to complete the first task in a least amount of time;
    reserve, as part of a first plan, each resource of the first set of resources with a different temporal element;
    control operation of the first worker in completing the first task by the different temporal element specified for each resource of the first set of resources in the first plan;
    receive a second task for completion by a second worker of the plurality of workers;
    detect a second set of the plurality of resources with which to complete the second task in a least amount of time without temporal conflict with the first set of resources reserved for the first plan;
    reserve, as part of a second plan, each resource of the second set of resources with a different temporal element that is not conflicting with the temporal element of a common resource also specified as part of the first plan; and
    control operation of the second worker in completing the second task by the different temporal element specified for each resource of the second set of resources in the second plan.

* * * * *